Sept. 19, 1933.  C. A. COMPTON  1,927,228
FILTER
Filed June 28, 1930
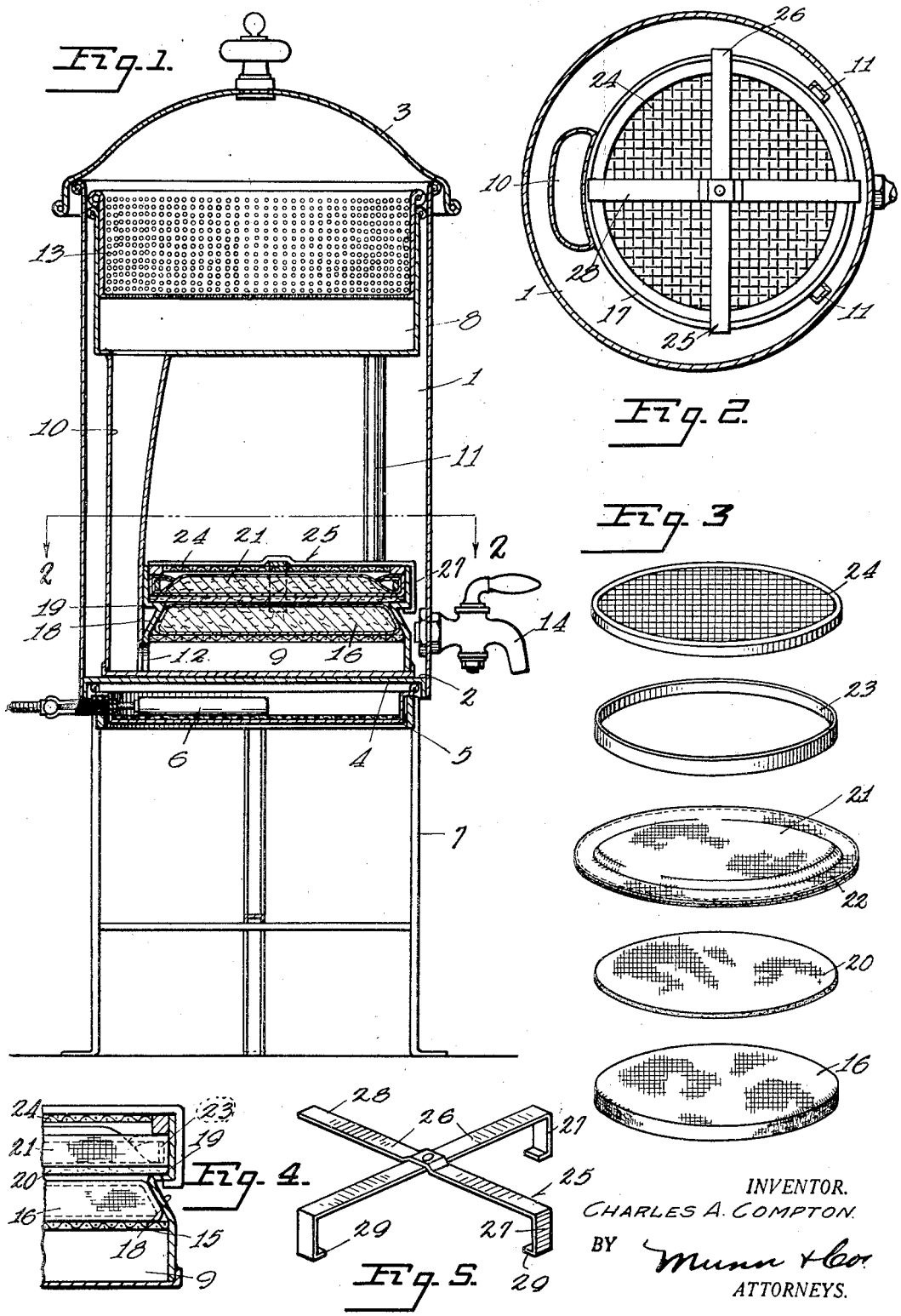
INVENTOR.
CHARLES A. COMPTON.
BY Munn & Co.
ATTORNEYS.

Patented Sept. 19, 1933

1,927,228

UNITED STATES PATENT OFFICE 1,927,228

FILTER

Charles A. Compton, Menlo Park, Calif.

Application June 28, 1930. Serial No. 464,611

3 Claims. (Cl. 210—149)

My invention relates to improvements in filters, and it consists in the combinations, constructions and arrangements hereinafter described and claimed.

An object of my invention is to provide a filter designed especially for filtering cooking oils so as to remove the foreign particles from the oil before it is again used for cooking purposes. The device provides novel means for first removing the larger particles of foreign matter and then for filtering the smaller foreign particles from the oil. The device also acts as a storage receptacle for the filtered oil, and this oil may be drawn off as desired by means of a faucet. The oil can be kept heated by a heating element, or the device may be placed directly upon the stove for this purpose.

A further object of my invention is to provide a device of the type described which makes use of a filtering means of novel construction. The device is an improvement over a strainer for oil and grease, application Serial No. 413,111, filed December 10, 1929.

Other objects and advantages will appear as the specification proceeds, and the novel features of the device will be particularly pointed out in the claims hereto annexed.

My invention is illustrated in the accompanying drawing, in which:

Figure 1 is a vertical section through the device,

Figure 2 is a section along the line 2—2 of Figure 1,

Figure 3 is a perspective view of the different parts forming the filtering means, Figure 4 shows an enlarged detail of the filtering means, Figure 5 is a perspective view of a clamp used in connection with the filtering means.

In carrying out my invention I provide a storage receptacle 1 which is preferably cylindrical in shape and provide it with a bottom 2. A cover 3 is removably disposed upon the top of the receptacle 1. It will be noted that the bottom 2 has a recess 4 (see Figure 1) for receiving a removable holder 5 which in turn carries a heating element 6. The cylindrical wall of the receptacle 1 extends below the top of the holder 5 so as to prevent the draining of liquid, flowing down the outside of the cylindrical wall, into the holder.

A stand 7 may be used for supporting the device, and in the present instance I have shown the stand as supporting the holder 5, which in turn supports the receptacle 1.

Within the receptacle 1 I dispose a temporary reservoir 8 for oil and the like, and this reservoir is connected to a lower compartment 9 by a tubular leg 10 that conveys oil from the reservoir 8 to the compartment. Two additional legs 11 extend from the reservoir 8 to the compartment 9, and with the tubular leg 10 space the reservoir above the compartment (see Figures 1 and 2). Openings 12 place the compartment in communication with the interior of the leg 10.

A cup-shaped screen 13 is removably secured in the reservoir 8 and is provided with minute holes for straining the oil from larger particles of foreign matter as the oil passes through the screen into the reservoir 8. It should be noted at this time that the reservoir 8 and compartment 9 are removable from the receptacle 1 as a unit.

The oil soon fills the compartment 9 and then flows through a filtering means now to be described before it enters the receptacle 1. The fine particles of foreign matter are removed by the filtering means, and therefore the oil in the receptacle 1 will be ready for use at any time and may be drawn from the receptacle by means of the faucet 14 (see Figure 1). If it is desired to keep the oil heated, the heating element 6 may be connected to a source of current (not shown). It is obvious that a gas burner may be used in place of the element 6 or that the receptacle 1 may be placed directly upon a stove or other heating surface.

Reference to Figure 4 shows an enlarged detail of the filtering mechanism. It will be noted from this figure that the top of the compartment 9 carries a screen 15, and that this screen supports filtering material 16 formed into the shape of a disc (note the lowermost filter in Figure 3). The disc 16 is preferably formed of fluffy cotton or the like enclosed in a sheet of muslin or other suitable material.

The cylindrical wall 17 forming a part of the compartment 9 has an inwardly and upwardly extending portion 18 (see Figure 4) disposed directly above the screen 15. A shoulder 19 is also provided in the wall 17 and is disposed at the top of the inclined portion 18. The filtering member 16 is placed upon the screen 15 and is wedged into the space afforded by the inclined portion 18 (note Figure 4). Above the member 16 I place a fabric 20 such as flannel, and this flannel is cut in the shape of a circle as shown in Figure 3 and has a diameter large enough to cause it to extend over the shoulder 19. It will be seen from the description thus far that oil in passing upwardly through the screen 15 and the filtering means 16 is directed toward the center of the device and away from the marginal edges of the filtering material above the shoulder 19 by the inclined portion 18. This portion of the wall causes all of the oil to pass through the filter member 20 and not to pass around the marginal edge of this member. This is a vital feature in causing all of the oil to be filtered and thus to remove all foreign matter.

Above the member 20 I dispose another filter 21 constructed in very much the same manner as the filter 16 except that Figure 3 shows the filter 21 as being provided with an annular flange 22. This cloth flange is passed around a flexible ring 23 (see Figures 1 and 4), this ring also being shown in Figure 3. The ring tends to clamp the cloth flange 22 against the inner surface of the wall 17, and this prevents oil from seeping past the filter and along the inner surface of the wall. Upon the top of the filter 21 I dispose a second screen 24 (see Figure 3), and this screen has a rim that is received within the wall 17. The screen 24 is held in place by a clamp indicated generally at 25 in Figure 5. This clamp has cross arms 26 secured together at their centers, and the ends of the cross arms are provided with downwardly-extending legs 27 with the exception of one of the ends 28 that is not so provided. The legs 27 have inwardly-extending portions 29.

In Figure 2 I show the clamp 25 in position, and Figures 1 and 4 show how the legs 27 cause the portions 29 to engage with the shoulder 19 and thus hold the clamp in place. The clamp in turn retains all of the filters and screens in their proper relations.

From the foregoing description of the various parts of the device, the operation thereof may be readily understood.

The cover 3 is removed and the oil to be filtered is poured into the cup-shaped screen 13. The oil will pass through the screen 13 into the reservoir 8 and will be conveyed from this reservoir to the compartment 9 by means of the hollow leg 10. At this point the oil will rise through the various screens and filters and will be prevented from passing around the marginal edges of the filters due to the inclined wall portion 19 and the action of the ring 23 in holding the cloth flange 22 against the wall 17. The filtered oil passes into the receptacle 1 where it may be withdrawn as desired.

The device may be readily cleaned, and for this purpose I make the entire mechanism removable from the receptacle 1. All of the filters can be removed one from another as soon as the clamp 25 is freed. Clean filters and screens may be substituted for the ones removed. The device is automatic in operation, and not only acts as a filter but acts as a storage for the oil.

Although I have shown and described one embodiment of my invention, it is to be understood that the same is susceptible of various changes, and I reserve the right to employ such changes as may come within the scope of the claims hereto attached.

I claim:

1. In a filter, a compartment having an inwardly inclined wall portion terminating in a shoulder, a filtering member supported on the shoulder, and a yielding ring for holding the filtering member in intimate contact with the compartment wall, said inclined wall directing fluid passing through the compartment toward the center of the latter and away from the marginal edge of the filtering member.

2. In a filter, a compartment having an inwardly inclined wall portion terminating in a shoulder, a filtering member supported on the shoulder, a yielding ring for holding the filtering member in intimate contact with the compartment wall, said inclined wall directing fluid passing through the compartment toward the center of the latter and away from the marginal edge of the filtering member, and means for clamping the latter against said shoulder, and allowing the filtering member to be removed for cleaning.

3. A filter comprising an inverted cup-shaped member with an outwardly-extending shoulder and a flange rising above the shoulder, a disc filter resting on the shoulder, a second filter disposed on the disc, a ring clamping the second filter to the flange, a screen overlying the second filter, a third filter disposed beneath the disc, and a screen supporting the third filter.

CHARLES A. COMPTON.